(12) United States Patent
Liu et al.

(10) Patent No.: US 11,500,246 B2
(45) Date of Patent: Nov. 15, 2022

(54) LIGHT SOURCE MODULE AND DISPLAY DEVICE

(71) Applicant: Coretronic Corporation, Hsin-Chu (TW)

(72) Inventors: Han-Yuan Liu, Hsin-Chu (TW); Shih-Yen Cheng, Hsin-Chu (TW); Chun-Chien Liao, Hsin-Chu (TW); Chun-Wei Lee, Hsin-Chu (TW); Yung-Lung Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/510,413

(22) Filed: Oct. 26, 2021

(65) Prior Publication Data
US 2022/0137458 A1    May 5, 2022

(30) Foreign Application Priority Data

Nov. 4, 2020   (CN) .......................... 202022516727.9

(51) Int. Cl.
*G02F 1/00* (2006.01)
*G02F 1/13357* (2006.01)

(52) U.S. Cl.
CPC .. *G02F 1/133605* (2013.01); *G02F 1/133603* (2013.01); *G02F 1/133608* (2013.01)

(58) Field of Classification Search
CPC ......... G02F 1/133603; G02F 1/08; G02F 1/05
See application file for complete search history.

(56) References Cited

U.S. PATENT DOCUMENTS

| | | | | |
|---|---|---|---|---|
| 2007/0070625 | A1* | 3/2007 | Bang | G02F 1/133603 362/240 |
| 2018/0217449 | A1* | 8/2018 | Mifune | G02F 1/133605 |
| 2019/0094616 | A1* | 3/2019 | Kim | G02F 1/133605 |
| 2020/0096821 | A1* | 3/2020 | Kyoukane | G02F 1/133606 |
| 2021/0165280 | A1* | 6/2021 | Lee | G02F 1/133606 |
| 2021/0372594 | A1* | 12/2021 | Lee | G02F 1/133603 |
| 2021/0397049 | A1* | 12/2021 | Allen | G02F 1/133605 |

FOREIGN PATENT DOCUMENTS

| | | |
|---|---|---|
| CN | 103091899 A | 5/2013 |
| TW | 201426094 A | 7/2014 |
| TW | 201634986 A | 10/2016 |
| TW | 202011093 A | 3/2020 |

* cited by examiner

*Primary Examiner* — Gerald J Sufleta, II

(57) ABSTRACT

A light source module includes a substrate, a reflective sheet, a plurality of light-emitting elements, an adhesive layer, and a frame. The reflective sheet is disposed on the substrate and has a side wall, a protrusion and a plurality of openings. The protrusion is protruded in a direction away from the substrate and has a mesh structure to define a plurality of dimming areas. The plurality of openings respectively correspond to the plurality of dimming areas. The plurality of light-emitting elements are disposed on the substrate, and the plurality of light-emitting elements are respectively disposed to pass through the plurality of openings. The adhesive layer is disposed between the substrate and the reflective sheet. The frame surrounds the reflective sheet and the plurality of light-emitting elements. The side wall of the reflective sheet is disposed on the frame. A display device of the invention is further provided.

11 Claims, 5 Drawing Sheets

LIGHT SOURCE MODULE AND DISPLAY DEVICE

CROSS-REFERENCE TO RELATED APPLICATION

This application claims the priority benefit of China application 202022516727.9, filed on 2020 Nov. 4. The entirety of the above-mentioned patent application is hereby incorporated by reference herein and made a part of this specification.

FIELD OF THE INVENTION

The invention relates to a light source module, and more particularly to a light source module that may be used in a display device and a display device using the light source module.

BACKGROUND OF THE INVENTION

A liquid crystal display device includes a liquid crystal display panel and a backlight module. Because the liquid crystal display panel itself does not emit light, it is necessary to rely on the backlight module to provide a display light source to the liquid crystal display panel. Therefore, the main function of the backlight module is to provide the display light source with high brightness and high uniformity.

Traditionally, the backlight modules may be divided into edge type backlight modules and direct type backlight modules. Generally speaking, the direct type backlight modules are adapted to local dimming, and the light sources are separated by grilles. In addition, a frame is also provided on the periphery of the light-emitting area to bear the optical film.

However, the use of grilles and frames will reduce the overall optical brightness, resulting in poor light utilization efficiency of the backlight module. In addition, the grilles will increase the weight of the backlight module, so that the liquid crystal display device as a whole may not be made lighter and thinner.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module, which may increase the light utilization efficiency and has the advantage of lighter weight.

The invention provides a display device, which may increase the light utilization efficiency and has the advantage of lighter weight.

Other advantages and objects of the invention may be further illustrated by the technical features broadly embodied and described as follows.

In order to achieve one or a portion of or all of the objects or other objects, a light source module provided in an embodiment of the invention includes a substrate, a reflective sheet, a plurality of light-emitting elements, an adhesive layer, and a frame. The reflective sheet is disposed on the substrate and has a side wall, a protrusion and a plurality of openings. The protrusion is protruded in a direction away from the substrate and has a mesh structure with a plurality of meshes to define a plurality of dimming areas. The plurality of openings respectively correspond to the dimming areas. The plurality of light-emitting elements are disposed on the substrate, and the plurality of light-emitting elements are respectively disposed to pass through the plurality of openings. The adhesive layer is disposed between the substrate and the reflective sheet. The frame is disposed on the substrate and surrounds the reflective sheet and the plurality of light-emitting elements. The side wall of the reflective sheet is disposed on the frame.

In order to achieve one or a portion of or all of the objects or other objects, a display device provided in an embodiment of the invention includes a display panel and the above-mentioned light source module. The display panel is disposed on a light-emitting side of the light source module.

In the light source module of the embodiment of the invention, the reflective sheet has a protrusion with mesh shape to define a plurality of dimming areas, and the plurality of light-emitting elements are respectively disposed in the plurality of dimming areas. Therefore, the protrusion may replace the grilles in the known direct type light source module. As such, the protrusion may also reduce the weight of the light source module while achieving the local dimming effect. In addition, the side wall of the reflective sheet is also disposed on the frame. Due to the effect of the reflective sheet reflecting the light, the light transmitted to the grille or frame of the known direct type light source module may be reflected by the reflective sheet in the light source module of the embodiment of the invention, thereby increasing the light utilization efficiency. Since the display device of the embodiment of the invention uses the above-mentioned light source module, it may also increase the light utilization efficiency and has the advantage of lighter weight.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
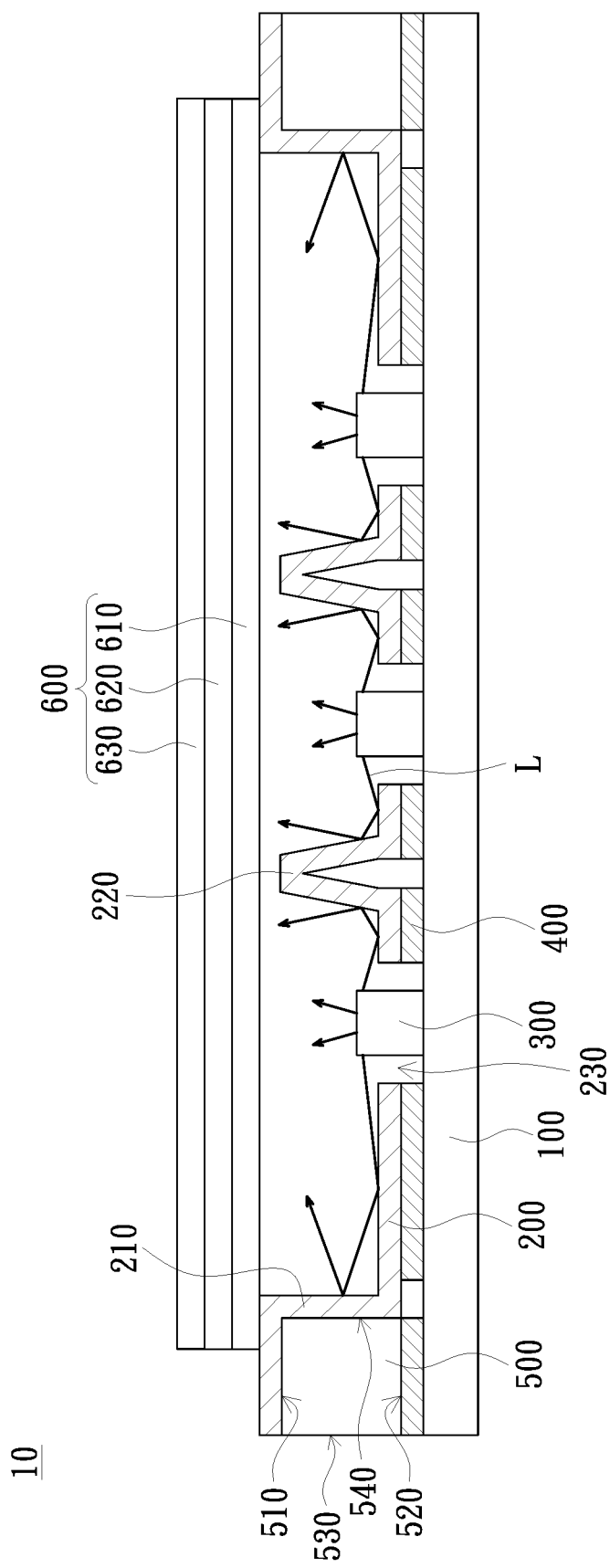
FIG. 1 is a cross-sectional schematic diagram of a light source module of one embodiment of the invention.
Figure 2:
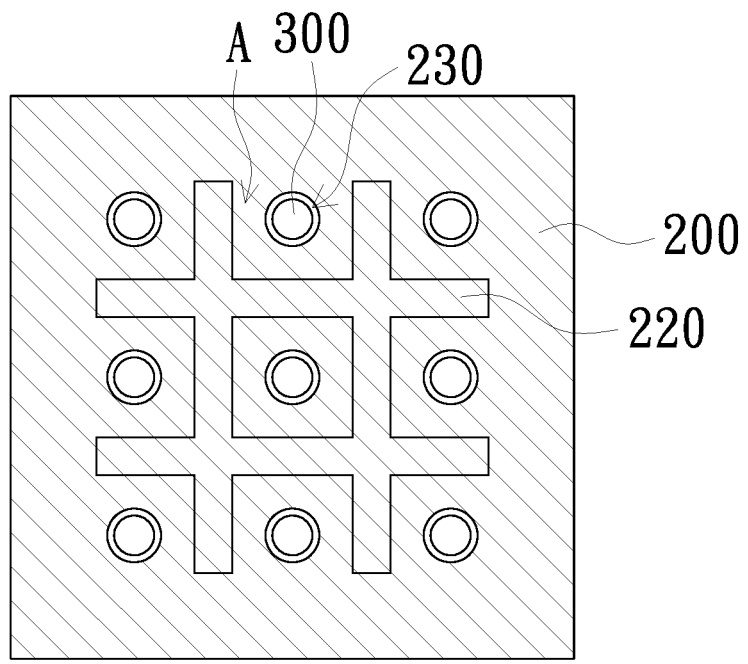
FIG. 2 is a schematic top view of a light source module of one embodiment of the invention.

FIG. 1 is a cross-sectional schematic diagram of a light source module of one embodiment of the invention. FIG. 2 is a schematic top view of a partial area of a light source module of one embodiment of the invention. Referring to FIG. 1 and FIG. 2, a light source module 10 of the embodiment includes a substrate 100, a reflective sheet 200, a plurality of light-emitting elements 300, an adhesive layer 400, and a frame 500. The reflective sheet 200 is disposed on the substrate 100 and has a side wall 210, a protrusion 220 and a plurality of openings 230. The plurality of light-emitting elements 300 are disposed on the substrate 100 and are respectively disposed to pass through the openings 230. The adhesive layer 400 is, for example, disposed between the substrate 100 and the reflective sheet 200. The frame 500 is disposed on the substrate 100 and surrounds the reflective sheet 200 and the plurality of light-emitting elements 300.

The protrusion 220 of the reflective sheet 200 is protruded in a direction away from the substrate 100 and presents a mesh structure with multiple meshes in the top view direction (as shown in FIG. 2) to define a plurality of dimming areas A. In the embodiment, the plurality of dimming areas A are arranged in an array, for example, but is not limited thereto. The plurality of openings 230 respectively correspond to the plurality of dimming areas A, which means that each dimming area A has a light-emitting element 300. Any two adjacent light-emitting elements 300 are separated by the protrusion 220 of the reflective sheet 200. In addition, a height of the protrusion 220 on the substrate 100 is greater than a height of the light-emitting element 300 on the substrate 100. In this way, the probability of a light L emitted by the light emitting element 300 in each dimming area A leaking to another dimming area A may be reduced, so as to avoid affecting the brightness contrast and the dimming effect. The quantities of the plurality of openings 230 and the plurality of dimming areas A in FIG. 1 and FIG. 2 are only for illustration, and are not limited thereto.

On the other hand, the side wall 210 of the reflective sheet 200 is, for example, disposed on the frame 500. Specifically, the side wall 210 is an extension of the reflective sheet 200 in contact with the frame 500. The frame 500 has a top surface 510, a bottom surface 520, an outer side surface 530, and an inner side surface 540. The top surface 510 is opposite to the bottom surface 520. The outer side surface 530 is opposite to the inner side surface 540. In the embodiment, the side wall 210 of the reflective sheet 200 is disposed on the inner side surface 540 and the top surface 510, for example, but is not limited thereto. In another embodiment, the side wall 210 of the reflective sheet 200 may also be disposed only on the inner side surface 540.

In the embodiment, the reflective sheet 200 is, for example, integrally formed, but is not limited thereto. Specifically, the reflective sheet 200 is formed with the protrusion 220 by performing a vacuum forming process on a flat reflective sheet. The invention does not particularly limit the shape of the protrusion 220 and may adjust the shape according to design requirements. In addition, the reflective sheet 200 may also be formed by splicing a plurality of reflective sheets, for example.

The substrate 100 is, for example, a printed circuit board, which may be a rigid board or a flex board. The substrate 100 is used to bear the reflective sheet 200, the light-emitting element 300, and the frame 500. The light-emitting element 300 is driven to emit light by the substrate 100.

The light-emitting element 300 may be a light-emitting diode, but may also be other types of light-emitting elements. In addition, the light-emitting element 300 may be a light-emitting chip that is cut directly from a wafer and not encapsulated, such as a light-emitting diode chip. For example, the light-emitting diode chip is a grain level nitride light-emitting diode chip having a dominant wavelength capable of emitting blue light, but the invention is not limited thereto. The quantity of the light-emitting elements 300 in FIG. 1 is three as an example, but is not limited thereto. In addition, the light-emitting elements 300 are arranged in an array on the substrate 100, as shown in FIG. 2. It should be noted that FIG. 2 is intended to present the shape of the protrusion 220 and the arrangement of the plurality of dimming regions A and the plurality of light-emitting elements 300. The shapes and quantities of the plurality of dimming regions A and the plurality of light-emitting elements 300 are merely illustrative, and the invention is not particularly limited thereto.

The function of the adhesive layer 400 is to fix the reflective sheet 200 on the substrate 100. Therefore, the invention does not particularly limit the material of the adhesive layer 400 as long as the fixing effect is achieved. For example, the adhesive layer 400 may be an adhesive or an adhesive tape, or a thermally conductive glue with thermal conductivity. In the embodiment, the adhesive layer 400 is, for example, further disposed between the substrate 100 and the frame 500, but is not limited thereto. The known common fixing method of the frame is screw locking or hook locking. However, the screw locking requires a long assembly time, and the hook locking is prone to have deformation. In the light source module 10 of the embodiment, the frame 500 is directly adhered to the substrate 100 with the adhesive layer 400, which is relatively simple in the assembly procedure and may save time and cost.

The light source module 10 of the embodiment, for example, further includes an optical film set 600, which is disposed on and bore by the frame 500. The optical film set 600 includes at least one optical film. The at least one optical film of the optical film set 600 is, for example, a polarization enhancement film, a diffusion film, a prism sheet or a composite prism sheet, but not limited thereto. The invention does not limit the quantity of the at least one optical film, and the quantity of the at least one optical film may be one or more. In the embodiment, three optical films 610, 620, and 630 are taken as an example, and they are stacked on the frame 500 in sequence. In addition, the optical films 610, 620, and 630 may also be different types depending on the function of the optical film. It should be noted that in order to clearly show the shape of the protrusion 220 of the reflective sheet 200 in FIG. 2, the optical film set 600 is not shown.

In the light source module 10 of the embodiment, the reflective sheet 200 has a protrusion 220 with mesh shape to define a plurality of dimming areas A, and the plurality of light-emitting elements 300 are respectively disposed in the plurality of dimming areas A. Therefore, the protrusion 220 may replace the grilles in the known direct type light source module. As such, the protrusion 220 may also reduce the weight of the light source module 10 while achieving the local dimming effect. In addition, the side wall 210 of the reflective sheet 200 is also disposed on the frame 500. Due to the effect of the reflective sheet 200 reflecting the light L, the light transmitted to the grille or frame of the known direct type light source module may be reflected by the reflective sheet 200 in the light source module 10 of the embodiment of the invention, thereby increasing the light utilization efficiency.

Figure 3:
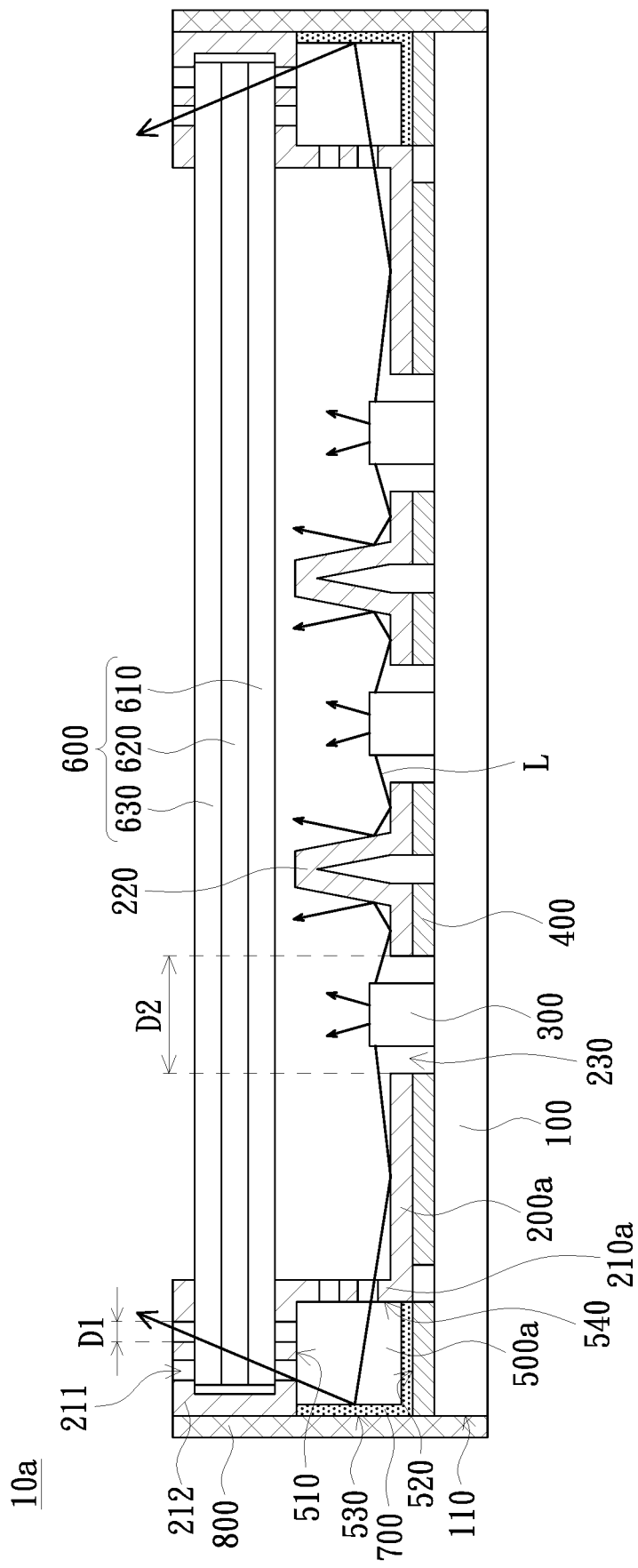
FIG. 3 is a cross-sectional schematic diagram of a light source module of another embodiment of the invention.

FIG. 3 is a cross-sectional schematic diagram of a light source module of another embodiment of the invention. Referring to FIG. 3, the light source module 10a of the embodiment is similar in structure and advantages to the light source module 10, and only the main differences in structure are described below. In the light source module 10a of the embodiment, the side wall 210a of the reflective sheet 200a has a plurality of through holes 211, and the frame 500a is, for example, a transparent light guide frame. In principle, a diameter D1 of the through hole 211 is smaller than a diameter D2 of the opening 230, but is not limited thereto. The plurality of through holes 211 are used to allow the light L transmitted to the edge of the light source module 10a to pass therethrough the through holes 211 and then enter the frame 500a. The light source module 10a of the embodiment, for example, further includes a reflective layer 700, which is disposed on the outer side surface 530 and the bottom surface 520 of the frame 500a. When entering the frame 500a, the light L may be reflected by the reflective layer 700 and then exit through the through holes 211 of the side wall 210a of the reflective sheet 200a on the top surface 510 and the inner side surface 540 of the frame 500a. The invention does not particularly limit the quantity, size and distribution density of the through holes 211, and the quantity, size and distribution density may be adjusted according to design requirements. With the above-mentioned design, the light source module 10a of the embodiment may reduce the non-luminous frame area to achieve a thin frame, which is similar to the effect of frameless.

In the embodiment, the side wall 210a of the reflective sheet 200a disposed on the top surface 510 has, for example, a bending portion 212 to fix the optical film set 600. Specifically, the bending portion 212 first extends in a direction away from the substrate 100, and then is bent in a direction facing the plurality of light-emitting elements 300. That is, after extending in a direction away from the substrate 100, the bending portion 212 is bent and extended in a direction substantially parallel to the substrate 100 and facing the area surrounded by the frame 500a. As such, the bending portion 212 and the partial reflective sheet 200a located on the top surface 510 of the frame 500a together form a groove-like structure. Therefore, the edge of the optical film set 600 is bore by the partial reflective sheet 200a on the top surface 510 of the frame 500a and is disposed in the groove-like structure formed by the bending portion 212 and the partial reflective sheet 200a located on the top surface 510 of the frame 500a. The bending portion 212 of the embodiment is only an example, and the invention does not limit the way to fix the optical film set 600. The bending portion 212 may also be, for example, applied to the light source module 10 mentioned above. In addition, the plurality of through holes 211 are also disposed in the bending portion 212. For example, a portion of the bending portion 212 in the direction that is parallel to the substrate 100 and facing the area surrounded by the frame 500a has a plurality of through holes 211. Therefore, the light L exiting from the frame 500a may still pass through the optical film set 600 and then exit through the plurality of through holes 211 of the bending portion 212. As such, in addition to reducing the non-luminous frame area, the effect of frameless is achieved, the chance of the light L directly emitting is reduced, so as to reduce the phenomenon of bright lines at edges.

The light source module 10a of the embodiment, for example, further includes a light shield layer 800, which is disposed on the outer side surface 530 of the frame 500a and extended to a side surface 110 of the substrate 100. The light shield layer 800 is, for example, light shield tape or light shield ink, but is not limited thereto. The light shield layer 800 of the embodiment, for example, further extends to the bending portion 212, that is, the light shield layer 800 is disposed on the side of the light source module 10a to absorb light to avoid light leakage. The light shield layer 800 may not be provided when the portion of the bent portion 212 extending in the direction away from the substrate 100 does not have the through holes 211 and the outer surface 530 of the frame 500a is provided with the reflective layer 700.

Figure 4:
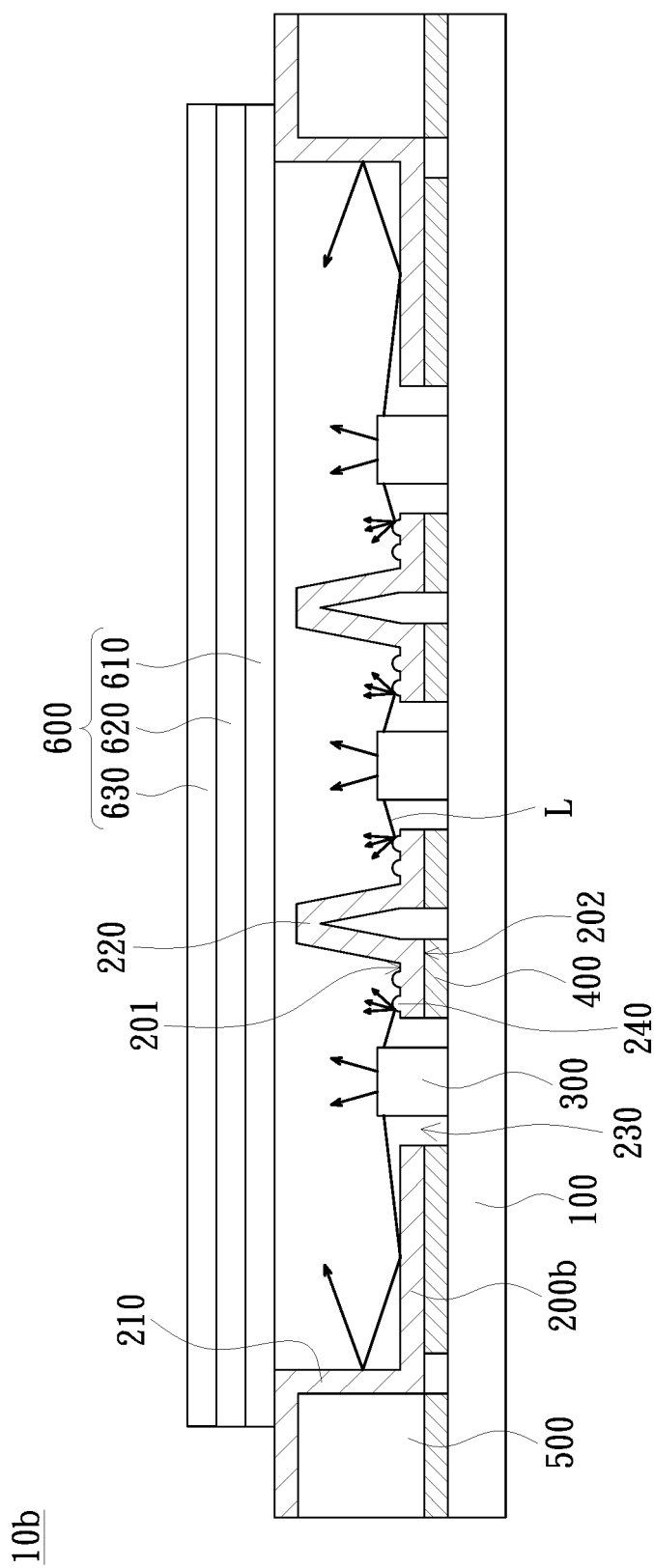
FIG. 4 is a cross-sectional schematic diagram of a light source module of another embodiment of the invention.

FIG. 4 is a cross-sectional schematic diagram of a light source module of another embodiment of the invention. Referring to FIG. 4, the light source module 10b of the embodiment is similar in structure and advantages to the light source module 10, and only the main differences in structure are described below. In the light source module 10b of the embodiment, the reflective sheet 200b further has a first surface 201 and a second surface 202 opposite to the first surface 201. The first surface 201 is relatively away from the substrate 100, and the second surface 202 faces the substrate 100. The adhesive layer 400 is, for example, connected to the second surface 202 and the substrate 100. The first surface 201 has, for example, a plurality of microstructures 240, which are shown as dots in FIG. 4, but are not limited thereto. The plurality of microstructures 240 may increase the ability of the reflective sheet 200b to scatter light, thereby increasing the overall light uniformity of the light source module 10b. In addition to the design of the microstructures 240, the first surface 201 in another embodiment may also be roughened, so that the surface roughness of the first surface 201 is greater than that of the second surface 202, which may also achieve the effect of increasing the light scattering. The above-mentioned design may also be applied to the light source modules 10, 10a, and the bending portion 212 may also be applied to the light source module 10b. The invention does not particularly limit the structural design of the light source modules 10, 10a and 10b.

Figure 5:
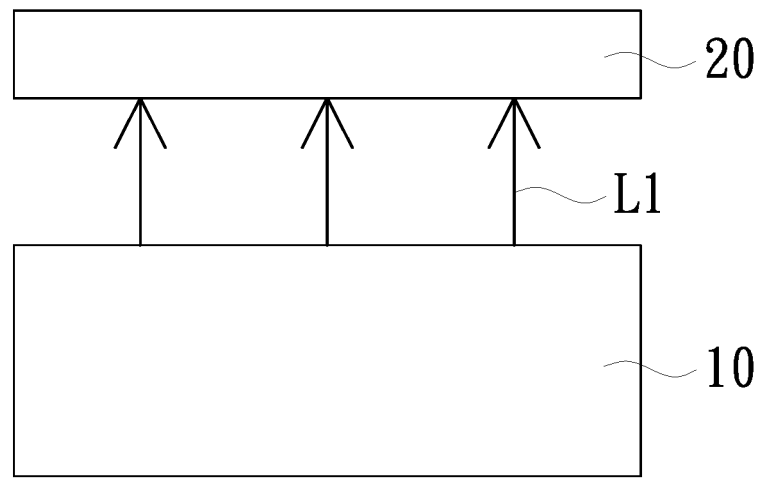
FIG. 5 is a cross-sectional schematic diagram of a display device of one embodiment of the invention.

FIG. 5 is a cross-sectional schematic diagram of a display device of one embodiment of the invention. Referring to FIG. 5, the display device 1 of the embodiment includes the aforementioned light source module 10 and a display panel 20. The display panel 20 is disposed on a light-emitting side of the light source module 10. The display panel 20 may be a liquid crystal display panel or other non-self-luminous display panels. The light source module 10 is used to provide a surface light source L1 to the display panel 20 as a display light source. The light source module 10 may be replaced with the light source module of any of the above embodiments. Since the light source module 10 of the display device 1 of the embodiment may increase the light utilization efficiency and has the advantage of lighter weight, the display device 1 using the light source module 10 may also increase the light utilization efficiency, and also has the advantage of lighter weight.

In summary, in the light source module of the embodiment of the invention, the reflective sheet has a protrusion with mesh shape to define a plurality of dimming areas, and the plurality of light-emitting elements are respectively disposed in the plurality of dimming areas. Therefore, the protrusion may replace the grilles in the known direct type light source module. As such, the protrusion 220 may also reduce the weight of the light source module while achieving the local dimming effect. In addition, the side wall of the reflective sheet is also disposed on the frame. Due to the effect of the reflective sheet reflecting the light, the light transmitted to the grille or frame of the known direct type light source module may be reflected by the reflective sheet in the light source module of the embodiment of the invention, thereby increasing the light utilization efficiency. Since using the above-mentioned light source module, the display device of the embodiment of the invention may also increase the light utilization efficiency and has the advantage of lighter weight.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface and the second surface are only used for distinguishing various elements and do not limit the number of the elements.

What is claimed is:

1. A light source module, comprising a substrate, a reflective sheet, a plurality of light-emitting elements, an adhesive layer, and a frame, wherein:
   the reflective sheet is disposed on the substrate and has a side wall, a protrusion and a plurality of openings, the protrusion is protruded in a direction away from the substrate and has a mesh structure with a plurality of meshes to define a plurality of dimming areas, and the plurality of openings respectively correspond to the plurality of dimming areas;
   the plurality of light-emitting elements are disposed on the substrate, and the plurality of light-emitting elements are respectively disposed to pass through the plurality of openings;
   the adhesive layer is disposed between the substrate and the reflective sheet; and
   the frame is disposed on the substrate and surrounds the reflective sheet and the plurality of light-emitting elements, and the side wall of the reflective sheet is disposed on the frame, wherein the frame has a top surface, a bottom surface, an outer side surface, and an inner side surface, the top surface is opposite to the bottom surface, the outer side surface is opposite to the inner side surface, the side wall of the reflective sheet is disposed on the inner side surface and the top surface, the side wall has a plurality of through holes, and the frame is a transparent light guide frame.

2. The light source module according to claim 1, further comprising a reflective layer, disposed on the outer side surface and the bottom surface.

3. The light source module according to claim 1, wherein the side wall disposed on the top surface has a bending portion, the bending portion first extends in a direction away from the substrate and then is bent in a direction facing the plurality of light-emitting elements, and the bending portion is adapted to fix an optical film.

4. The light source module according to claim 1, wherein a diameter of the plurality of through holes is smaller than a diameter of the plurality of openings.

5. The light source module according to claim 1, wherein the adhesive layer is further disposed between the substrate and the frame.

6. The light source module according to claim 1, further comprising a light shield layer, disposed on the outer side surface and extended to a side surface of the substrate.

7. The light source module according to claim 1, wherein the reflective sheet further has a first surface and a second surface opposite to the first surface, the first surface is facing away from the substrate, the second surface faces the substrate, and the first surface has a plurality of microstructures.

8. The light source module according to claim 1, wherein the reflective sheet further has a first surface and a second surface opposite to the first surface, the first surface is facing away from the substrate, the second surface faces the substrate, and a surface roughness of the first surface is greater than a surface roughness of the second surface.

9. The light source module according to claim 1, wherein the reflective sheet is integrally formed.

10. The light source module according to claim 1, wherein the reflective sheet is formed by splicing a plurality of reflective sheets.

11. A display device, comprising a light source module and a display panel, wherein:
the light source module comprises a substrate, a reflective sheet, a plurality of light-emitting elements, an adhesive layer, and a frame, wherein:
the reflective sheet is disposed on the substrate and has a side wall, a protrusion and a plurality of openings, the protrusion is protruded in a direction away from the substrate and has a mesh structure with a plurality of meshes to define a plurality of dimming areas, and the plurality of openings respectively correspond to the plurality of dimming areas;
the plurality of light-emitting elements are disposed on the substrate, and the plurality of light-emitting elements are respectively disposed to pass through the plurality of openings;
the adhesive layer is disposed between the substrate and the reflective sheet; and
the frame is disposed on the substrate and surrounds the reflective sheet and the plurality of light-emitting elements, and the side wall of the reflective sheet is disposed on the frame, wherein the frame has a top surface, a bottom surface, an outer side surface, and an inner side surface, the top surface is opposite to the bottom surface, the outer side surface is opposite to the inner side surface, the side wall of the reflective sheet is disposed on the inner side surface and the top surface, the side wall has a plurality of through holes, and the frame is a transparent light guide frame; and
the display panel is disposed on a light-emitting side of the light source module.

\* \* \* \* \*